United States Patent
Marchesini et al.

(10) Patent No.: US 9,597,617 B2
(45) Date of Patent: Mar. 21, 2017

(54) ARCHIMEDES SCREW SEPARATION PLANT FOR TREATING SLURRY

(75) Inventors: Vainer Marchesini, San Prospero (IT); Massimo Passerini, Mirabello (IT); Marco Gaddi, San Prospero (IT)

(73) Assignee: WAM INDUSTRIALE S.P.A., Modena (IT)

( * ) Notice: Subject to any disclaimer, the term of this patent is extended or adjusted under 35 U.S.C. 154(b) by 1082 days.

(21) Appl. No.: 13/808,131

(22) PCT Filed: Jul. 5, 2011
(Under 37 CFR 1.47)

(86) PCT No.: PCT/IB2011/001569
§ 371 (c)(1),
(2), (4) Date: May 14, 2013

(87) PCT Pub. No.: WO2012/004649
PCT Pub. Date: Jan. 12, 2012

(65) Prior Publication Data
US 2014/0144823 A1 May 29, 2014

(30) Foreign Application Priority Data
Jul. 5, 2010 (IT) .............................. BO2010A0430

(51) Int. Cl.
| | |
|---|---|
| B01D 29/90 | (2006.01) |
| B30B 9/16 | (2006.01) |
| B30B 9/18 | (2006.01) |
| B01D 29/35 | (2006.01) |
| B01D 29/48 | (2006.01) |
| B01D 29/64 | (2006.01) |
| B30B 9/12 | (2006.01) |

(52) U.S. Cl.
CPC .......... *B01D 29/90* (2013.01); *B01D 29/356* (2013.01); *B01D 29/48* (2013.01); *B01D 29/6476* (2013.01); *B30B 9/128* (2013.01); *B30B 9/16* (2013.01); *B30B 9/18* (2013.01)

(58) Field of Classification Search
None
See application file for complete search history.

(56) References Cited

U.S. PATENT DOCUMENTS

| | | | |
|---|---|---|---|
| 2008/0028952 A1 | 2/2008 | Duperon | |
| 2011/0048255 A1* | 3/2011 | Eichler | ............... B01D 29/118 |
| | | | 100/110 |

FOREIGN PATENT DOCUMENTS

| | | |
|---|---|---|
| DE | 196 19 147 | 11/1997 |
| DE | 20 2007 007606 | 10/2008 |
| DE | 20 2008 011369 | 11/2008 |
| EP | 0 156 206 | 10/1985 |
| EP | 1 066 953 | 1/2001 |
| GB | 1 200 842 | 8/1970 |

(Continued)

*Primary Examiner* — Terry Cecil
(74) *Attorney, Agent, or Firm* — Leason Ellis LLP

(57) ABSTRACT

An Archimedes screw plant for separating slurry includes a tubular sifting device; a slurry feeding device; a device for evacuating the liquid fraction; and a device for evacuating the substantially dry separated solid. The device includes an upper compaction chamber of the separated solid where a solid plug of product is formed. In addition, the tubular sifting device has an upper opening being provided with an auxiliary contrast element for forming the solid plug of product.

11 Claims, 6 Drawing Sheets

(56) References Cited

FOREIGN PATENT DOCUMENTS

| | | |
|---|---|---|
| JP | 51 038778 | 3/1976 |
| JP | S55-112391 | 8/1980 |
| JP | S56-500737 | 6/1981 |
| JP | H02-151397 | 6/1990 |
| JP | H07-216849 | 8/1995 |
| JP | H10-80795 | 3/1998 |
| JP | 2005-074384 | 3/2005 |
| JP | 2005-136919 | 5/2005 |
| JP | 2008-036703 | 2/2008 |
| JP | 2009-136919 | 6/2009 |
| WO | WO 2008/096381 | 8/2008 |

\* cited by examiner

SECT A-A

SECT A-A

ARCHIMEDES SCREW SEPARATION PLANT FOR TREATING SLURRY

TECHNICAL FIELD

The present invention relates to an Archimedes screw separation plant for treating slurry.

The present invention finds advantageous, but not exclusive, application in the treatment of livestock effluents to which the following description will make explicit reference without loss of generality.

The present invention may also be used in the canning industry, for example for the preparation of tomato paste etc.

In other words, the findings of the present invention can be applied to any process which should separate from a slurry, the liquid phase from the solid phase (consisting substantially in solid separated agglomerate).

The purpose of said process is to have at the end, starting from a slurry, a first substantially liquid product, and a second substantially solid product.

BACKGROUND ART

Both horizontal and vertical axis Archimedes screw plants for separating slurry are well known, for example, in the treatment of livestock effluents.

Regarding a traditional vertical axis Archimedes screw separation plant, it comprises the following elements:
- a slurry feeding device towards a tubular sifting device;
- a vertical axis slurry feeding device inside which are housed advancing and pushing means, adapted to move and compress the slurry, and means adapted for filtering the slurry in transit;
- an evacuating device for the liquid slurry fraction after its separation from the solid fraction, separation substantially occurring inside said the tubular sieve;
- an evacuating device (19, 22) for the substantially dry separated solid after its separation from the liquid fraction, separation substantially occurring inside the tubular sieve as a result of flattening the slurry against the sifting wall and the filtering action of the holes on the sieve itself.

However, the vertical axis Archimedes screw separation plants on the market today present the following drawbacks:
- efficient separation between the liquid and the solid phase of the slurry cannot be obtained;
- sorts of "bridges" are formed between the filter wall and the slurry pushing means consisting of solid material clogging the sieve resulting in a loss of filtering surface; due to the abovementioned "bridges" and agglomerations formed within the sieve the plant must be frequently stopped causing significant economic losses to the manager and/or owner thereof, and
- there is not a regular and consistent supply of the slurry towards the tubular sifting device.

DISCLOSURE OF INVENTION

The present Archimedes screw separation plant was conceived, so as to overcome the abovementioned drawbacks.

Therefore, according to the present invention an Archimedes screw separation plant is provided as described in greater detail in the following description of the best mode of the invention and the accompanying drawings.

BRIEF DESCRIPTION OF THE DRAWINGS

For a better understanding of the present invention certain preferred embodiments will now be described, purely by way of non-limitative examples and with reference to the attached figures, wherein.

BEST MODE FOR CARRYING OUT THE INVENTION

In the attached figures, with 10 is indicated as a whole, a separation plant object of the present invention.

The plant 10 is used to filter slurry so as to isolate in one part the liquid phase, and, in the other, the dry separated solid agglomerate, being almost completely devoid of liquid particles.

Said plant 10 comprises a tubular sifting device 11 having a vertical axis (X) inside which are housed, advantageously but not necessarily, two advancing and pushing elements 12, 13 substantially conformed to an Archimedes screw (auger), which interpenetrate one in the other.

In this context the term "tubular sieve" must be meant as any tubular sieve having any cross-section, whether circular or polygonal, equal to any height.

Figure 3:
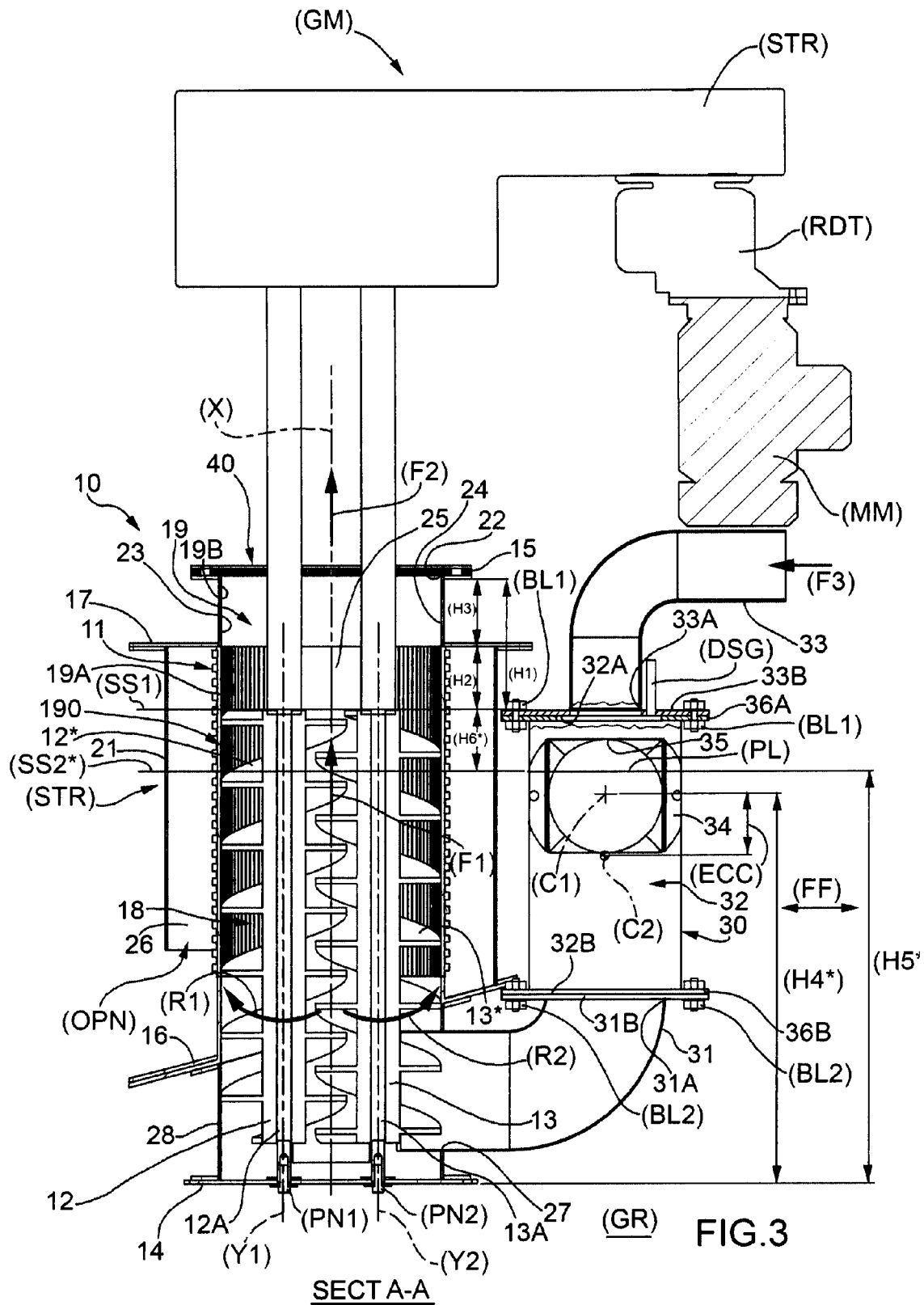
FIG. 3 shows a section A-A (according to a plan ($\Phi$)) executed on the three-dimensional rear view of FIG. 1, also represented in this figure is a first configuration of a siphon device also object of the present invention.

In addition, each advancing and pushing element 12, 13 provides a respective shaft 12A, 13A (FIG. 3).

Figure 2:
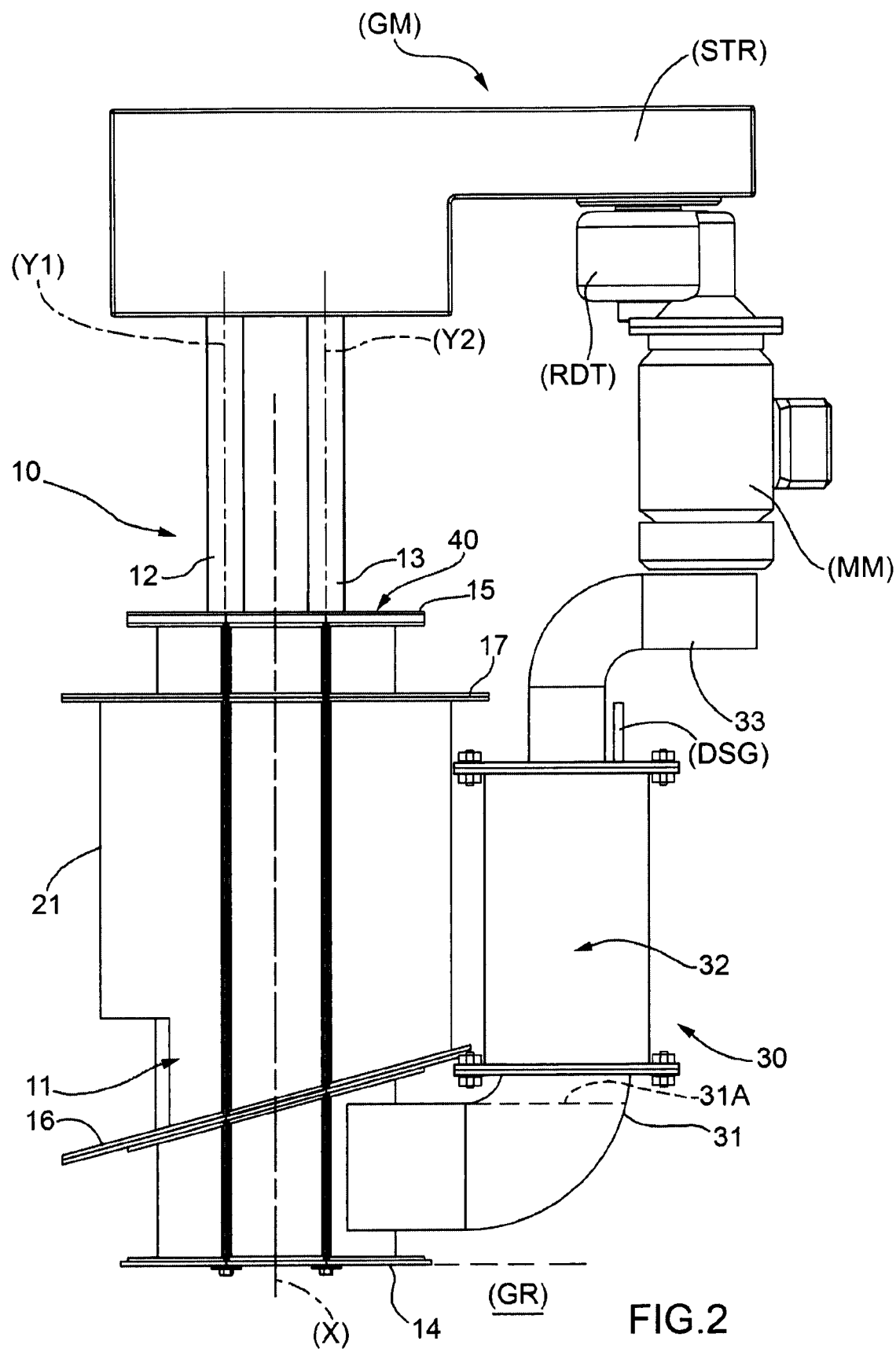
FIG. 2 represents a front view of the plant of FIG. 1.

In particular, the shaft 12A presents a respective vertical axis (Y1), while the shaft 13A foresees a respective vertical axis (Y2) (FIGS. 2, 3).

The vertical axes (X), (Y1) (Y2) are parallel to each other and all lie on the same vertical plane.

In the plant 10 object of the present invention the two Archimedes screws (augers), forming the two advancing and pushing elements 12, 13, can be interpenetrated by a near-tangency position of the coil ridges, to a position wherein each ridge scrapes the shaft of the contiguous Archimedes screw. In other words, depending on the needs, the rate of penetration between the two Archimedes screws can be varied by changing the distance between the vertical axes (Y1) (Y2).

As shown particularly in FIG. 1 the device 11 is contained in a supporting structure (STR) in metal carpentry which will be described in greater detail hereinafter.

The shafts 12A, 13A are placed in counter-rotation, or in equi-rotation, with respect to one another by a motor assembly (GM), which, in the particular embodiment shown in the attached figures, is located above the device 11. In the embodiment shown in the attached figures the shafts 12A, 13A rotate in counter-rotation, i.e., respectively, in clockwise direction according to arrow (R1), and anti-clockwise direction according to arrow (R2).

The motor assembly (GM) comprises an electric motor (MM) mechanically coupled with a reducer (RDT), in turn coupled with a gearbox (STR) containing a chain and a gear train so as to achieve the desired type of rotation of the two shafts 12A, 13A respectively around the axes (Y1), (Y2) arrows (R1), (R2).

Each generic coil 12* and 13*, respectively, of advancing and pushing element 12 and of advancing and pushing element 13, is coupled with the other coil 13*, 12*, so that each of which can execute the tasks of crushing, homogenization and flattening of the slurry in transit, but also of cleaning the opposite coil and of respective shafts 12A, 13A.

In other words, the plant consisting in the assembly of the two coils 12* and 13* is a self-cleaning plant.

The supporting structure (STR) comprises a lower end flange 14, an upper end flange 15 and two intermediate flanges 16, 17.

Note that the intermediate flange 16 is inclined with respect to the axis (X) for the purposes that will be later indicated in more detail.

Figure 1:
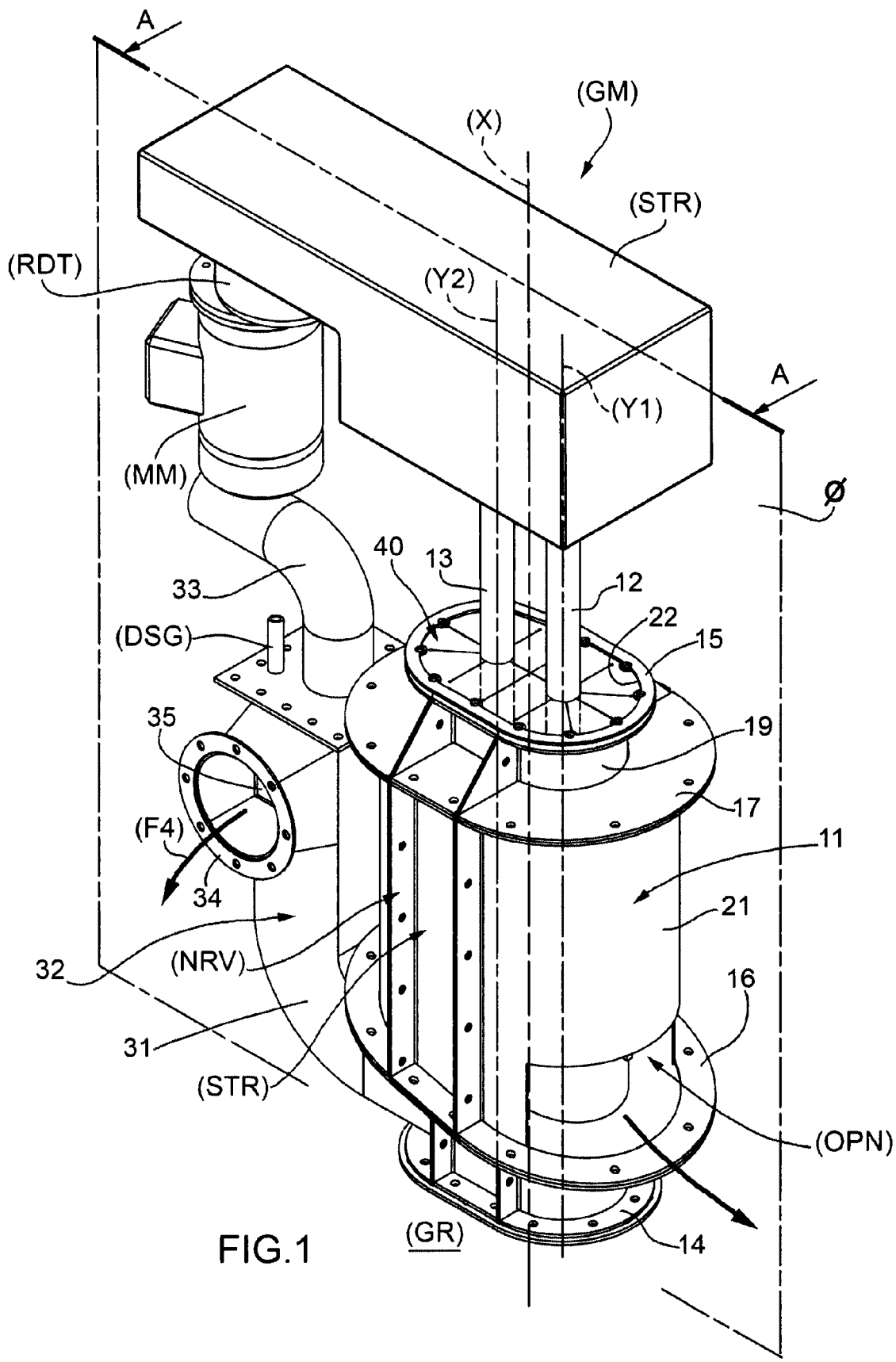
FIG. 1 illustrates a three-dimensional rear view of an Archimedes screw separation plant object of the present invention.

In addition, the flanges 14, 15, 16, 17 are mechanically connected together by a plurality of vertical metal ribs (NRV) (FIG. 1).

It can be seen by entering in more detail that the tubular sifting device 11 comprises a filtering punched wall 18 (FIG. 3) which, in a known way, serves to filter the slurry in transit upwardly from below according to an arrow (F1) under the action of the coils 12*, 13* of the advancing and pushing elements 12, 13.

In the upper part of the filtering punched wall 18 continues with a compaction chamber 19, which starts from a surface (SS1), which substantially coincides with the end of the coils 12*, 13*, and ends with the cited upper end flange 15.

As shown particularly in FIG. 3, coaxially to the filtering punched wall 18 is an outer sleeve 21 provided with an opening (OPN) to which a device is applied (not shown) to evacuate the liquid fraction after the separation from the solid fraction.

The intermediate flange 16 is attached to the lower end of the outer sleeve 21 to allow more drainage of the liquid and its conveyance towards the exit.

Fixed on the bottom plate 14 are two centering pins (PN1) and (PN2) of a respective shaft 12A, 13A. More specifically, since the shafts 12A, 13A are at least partially hollow at their ends, each pin (PN1), (PN2) is inserted into a corresponding seat of a corresponding shaft 12A, 13A allowing the centering of the same (as has already been said), and its rotation around that axis (Y1), (Y2) and according to the respective arrow (R1), (R2).

The assembly consisting in the filtering punched wall 18 and in the compaction chamber 19 ends with an opening 22 made in the upper flange 15. The width of the opening 22 is equal to that of any cross section (ST) of the device 11.

Vertically discharged from the upper opening 22 towards the outside is the dry separated solid (according to arrow (F2); FIG. 3).

In a first advantageous embodiment of the invention the opening 22 is devoid of any type of contrasting element because it is the gravitational force itself which affects upon the substantially dry material in the compaction chamber 19 completing its compaction, so upon exiting the opening 22 the material is dehydrated to an acceptable degree.

In other words, the compaction of the separated solid is substantially within the compaction chamber 19, wherein the compaction of the separated solid can be achieved, at least partially, due to the force of gravity on the separated solid itself.

More in detail, the compaction chamber 19 comprises a lower portion 19A, presenting a sifting wall and which, therefore, is adapted for further evacuating the liquid in the usual way, and a solid wall upper portion 19B (i.e. without sieve) wherein the actual pressing of the separated solid occurs. Note that both portions 19A, 19B of the compaction chamber 19 are free of coils 12*, 13*.

In an inventive way, it was found that by changing the height (H1) (FIG. 3) of the compaction chamber 19 the degree of dehydration of the separated solid may be varied.

In other words, if the height (H1) of the compaction chamber is increased the product amount present within will consequently increase. Therefore by the increasing of (H1) the force effected by the column of semi-solid material will be greater, and therefore the greater the degree of dehydration of the separated solid in the column itself.

Therefore, the height (H1) can be chosen depending on the material to be dehydrated, i.e. with very liquid slurry the height (H1) will have to be increased in order to reach the desired degree of dehydration and the formation of the so-called "solid plug".

In this context the term "solid plug" indicates the solid fraction contained in the dehydrated effluents and having a residual moisture of about 70%. In other words, the "solid plug" is the final solid product that is formed during the path (transportation, emergence, compaction) that vertically occurs in the tubular sifting device 11. Therefore, the "solid plug" is the final result of the solid-liquid separation process and is the product solid fraction, which entering was just effluents, and is formed as a result of pressure against the sifting walls, the vertical transport of the product and the weight of product itself that accumulates in the upper end of the device 11.

For the foregoing reasons, the plant 10 can be advantageously provided with a compaction chamber 19 whose height (H1) can be varied depending on the value of the amount of liquid in the slurry.

In addition, the desired pressing effect can also be achieved by properly adjusting the relative heights of the portion 19A (by height (H2)) and of the portion 19B (by height ((H3)) and of the compaction chamber 19 (by overall height (H1)), in order to balance an area of only effective pressing free of sifting (portion 19B) with a pressing and evacuation area of fluids (portion 19A) provided, instead, of sifting.

In a further embodiment not shown the height (H1) of the compaction chamber 19 is telescopically adjustable by an operator by way of manual means.

Figure 5:
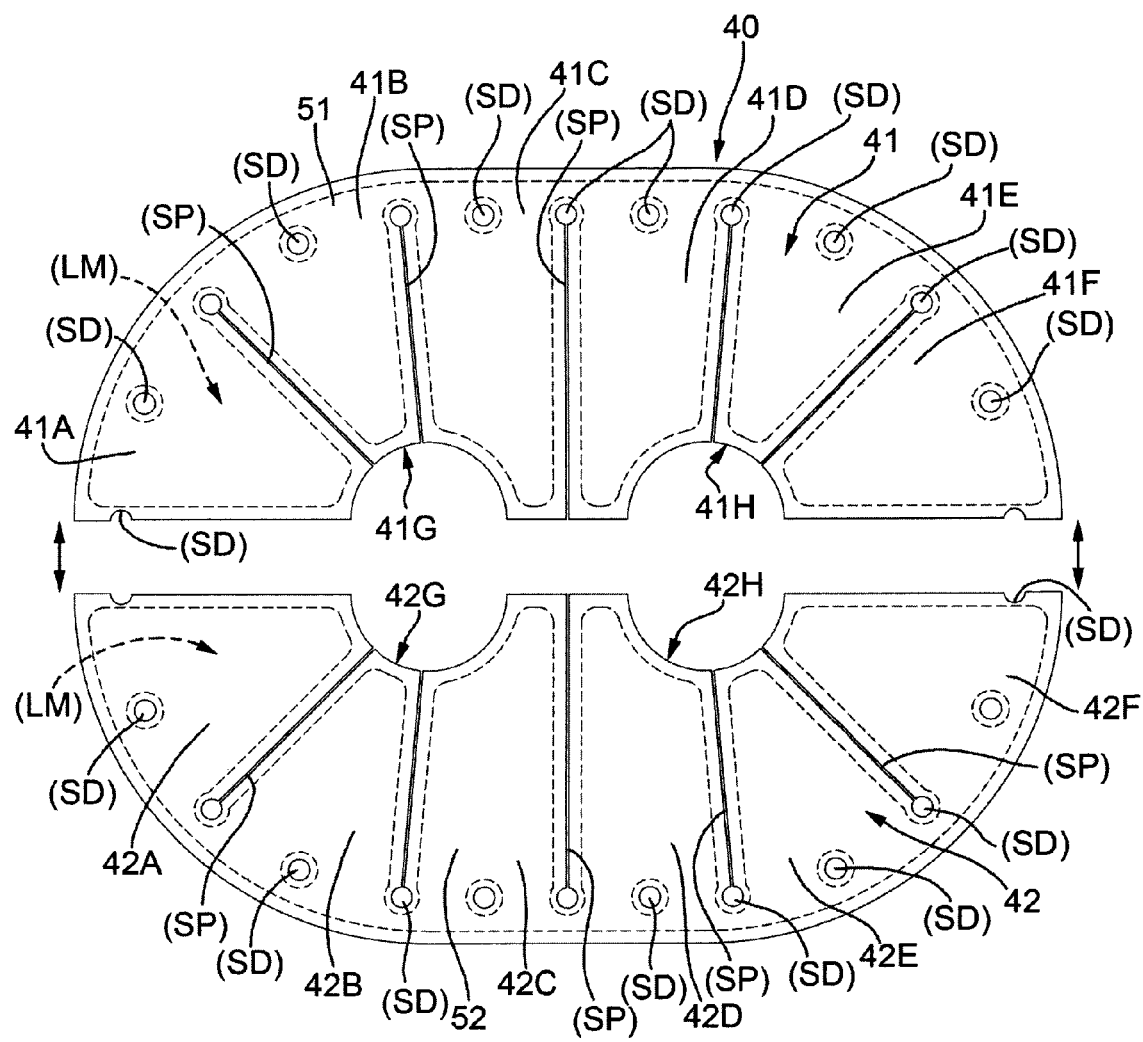
FIG. 5 represents a plan view of two counter pressure elements being part of a contrast element comprised in the plant illustrated in FIGS. 1, 2, 3, 4.
Figure 6:
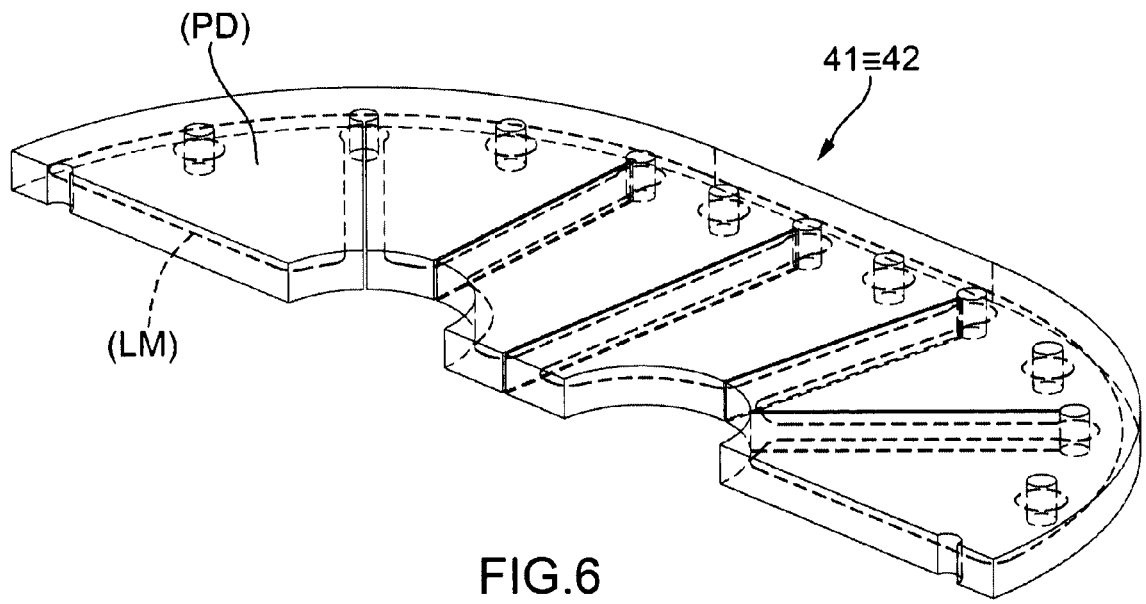
FIG. 6 shows an isometric view of a counter pressure device of a first type being part of the contrast element shown in FIG. 5.
Figure 7:
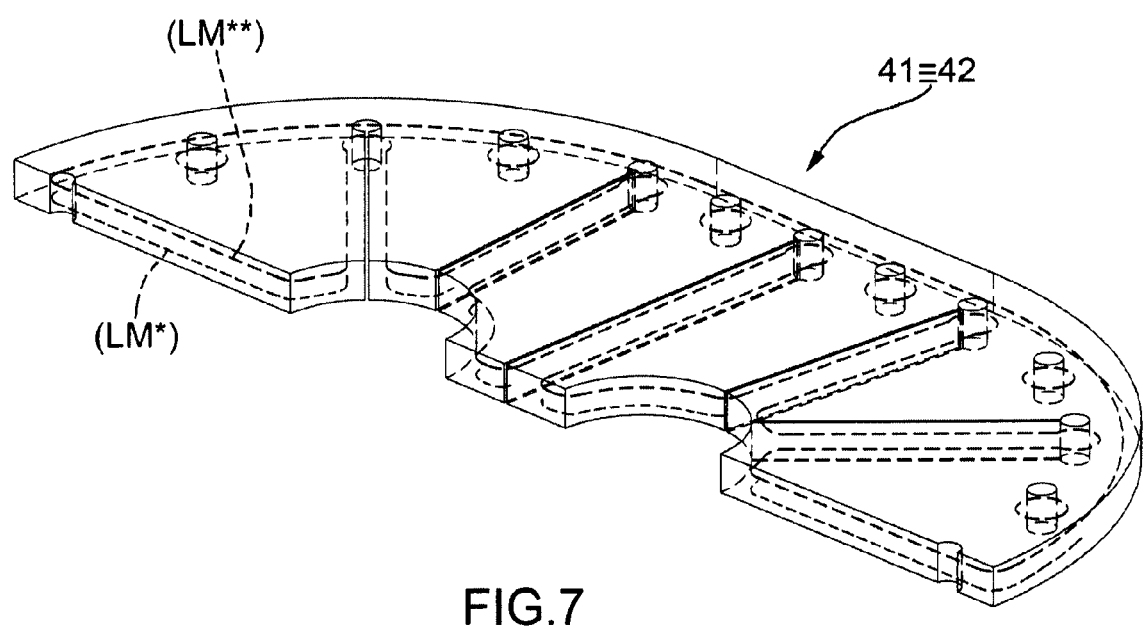
FIG. 7 illustrates an isometric view of a counter pressure device of a second type being part of the contrast element as in FIG. 5.

However, if the slurry liquid component entering the device 11 should be greater, to avoid having to provide a too high compaction chamber 19, a contrast element 40, shown schematically in FIGS. 1, 2, 3, and in more detail in FIGS. 5, 6, 7 can be adopted.

As shown in FIG. 5 in particular the contrast element 40 comprises two identical counter pressure devices 41, 42 facing each other.

It should be keep in mind also the fact that the contrast element 40 acts simultaneously upon all the material in transit from the opening 22, whose amplitude, as we have said, is substantially equal to that of any cross section (ST) of the device 11.

The counter pressure device 41 comprises a plurality of segments 41A, 41B, 41C, 41d, 41E, 41F adjacent to each other. Foreseen in correspondence to the free ends of the segments 41A, 41B, 41C is a cavity 41G adapted to embrace, in use, one half of the perimeter of the shaft 12A. Similarly in correspondence to the free ends of the segments 41D, 41E, 41F is provided a cavity 41H adapted to embrace, in use, one half of the perimeter of the shaft 13. All segments 41A, 41B, 41C, 41D, 41E, 41F are projecting from a common edge 51 provided with a plurality of seats (SD), each of which is adapted to receive, in use, a respective screw for fastening the counter pressure device 41 to the upper end flange 15. As again shown in FIG. 5 each segment 41A, 41B, 41C, 41D, 41E, 41F is separated from each adjacent segment by a space (SP). This space (SP) allows each segment 41A, 41B, 41C, 41D, 41E, 41F to flex, independently from the other segments, around the edge 51, which functions as a hinge when subjected to the action of thrust of the solid material exiting the compaction chamber 19.

Since the counter pressure device 42 is identical to the counter pressure device 41, to the counter pressure device 42 can be applied the same observation made earlier to counter pressure device 41. In particular, the segments 42A, 42B, 42C, 42D, 42E, 42F (this time projecting from an edge 52), the cavities 42G, 42H, the seats (SD) and the spaces (SP) have the same characteristics described above in relation to the corresponding elements belonging to the counter pressure device 41.

Obviously, in use, the counter pressure devices 41, 42 are mounted side by side to each other (FIG. 1) so that each pair of cavities 41G, 42G, and, respectively, 41H, 42H each embrace, a corresponding shaft 12A, 13A.

As shown in more detail in FIG. 6, each counter pressure device 41, 42 comprises, advantageously but not necessarily, a deformable plastic sheet (PD), properly shaped and cut, containing within it a respective elastic layer (LM) (made, for example, in spring steel, or any plastic material suitable for use) which shape substantially reproduces the shape of the group of segments 41A, 41B, 41C, 41D, 41E, 41F and the edge 51, respectively, segments 42A, 42B, 42C, 42D, 42E, 42F and the edge 52. Said elastic layer (LM) lies substantially in a plane parallel to the plane where the deformable plastic sheet (PD) lies and has been represented in hatched lines also in FIG. 5.

In FIG. 7 another embodiment is shown where instead of a single layer (LM) two layers (LM*) and (LM**) are provided which may be equal or different from each other as in material as in thickness. In addition, each layer (LM*), (LM**) can be composed of equal or different sections, from each other, so that each segment 41A, 41B, 41C, 41D, 41E, 41F, 42A, 42B, 42C, 42D, 42E, 42F is able to better respond to various stress factors of the material exiting from the opening 22 (FIG. 3). In other words, there may be cases in which the segment 41F must carry a greater share of compression on the output material with respect, for example, to the output material between segments 41C and 41D. In this case, the manufacturer may provide the user with a specially conceived contrast element 40 wherein the segment 41F is provided with two layers (LM*), (LM**), while each segment 41C, 41D internally comprises only one layer (LM*). The same effect could clearly be obtained by choosing a layer with a non uniform thickness, or a layer having different resistance properties passing from segment to segment.

Upon buyer request this plant 10 can be provided, therefore, with a set comprising a plurality of contrast elements having different response capacity according to the material to be treated.

In other words, if the user should realize that to dehydrate a certain very watery product a higher counter pressure is required, a replacement can be made of the first contrast element having, for example, a single layer (FIG. 6), with a second contrast element which instead provides the use of two layers (FIG. 7). Obviously, it is possible to conceive contrast elements having more than two layers.

As shown particularly in FIG. 1, the tubular sifting device presents a cross-sectional section to axis (X) of a substantially elongated elliptical shape, while each advancing and pushing element 12, 13 is housed in a respective seat 23, 24 (FIG. 3) having a substantially circular cross section.

The two seats 23, 24 are portions of the filtering punched wall 18 being substantially circular in shape and intersecting each other in a cusp 25.

It is obvious to underline that, since in FIG. 3 a longitudinal section of the plant 10 is shown, there is also a second elongated cusp element (opposite to the elongated cusp element 25) which is not visible in FIG. 3.

The seats 23, 24 advantageously must present a substantially circular shape so that the filtering punched wall 18 is touched by the edges of the coils 12*, 13* during the rotation of the advancing and pushing elements 12, 13.

Moreover, at least a portion of the filtering punched wall 18 is surrounded by outer sleeve 21 whose inner wall, along with the perforated filter wall 18, defines an annular discharge channel 26 through the opening (OPN), of only the liquid fraction after its separation from the separated solid thanks to the action affected by the holes present on the perforated filter wall 18 itself and on the portion 19A.

The lower portion of the filtering punched wall 18 is provided with an opening 27 connected, both mechanically and hydraulically, with a siphon apparatus 30 (FIG. 3).

Said siphon apparatus 30 comprises, in turn, a connecting duct 31, preferably but not necessarily, elbow shaped, whose upper end 31A terminates in a compensation chamber 32. The compensation chamber 32 is provided, in a known way, with a degassing tube (DSG) (FIGS. 3, 4) adapted for bringing the same compensation chamber 32 to the atmospheric pressure.

Fastened to the compensation chamber 32 is one end of a primary feeding duct 33 of slurry (according to arrow (F3)), and one end of an additional overflow duct 34, whose entrance mouth in the compensation chamber 32 has been designated with the number 35. Therefore, the amount of any excess slurry will be evacuated through the mouth 35 and the overflow duct 34 (according to a horizontal arrow (F4) (FIG. 1)).

As shown in FIG. 3, the compensation chamber 32 is box-shaped open at the upper 32A, and lower 32B ends, each of which is provided with a respective flange 36A, 36B.

As again shown in FIG. 3, to the free end 33A of primary feeding duct 33 is associated a corresponding flange 33B; equally to the free end 31A of the connecting duct 31 provided with a respective flange 31B.

Note also that on the flange 33B is fixed the degassing tube (DSG) perpendicular to it and also ends up inside the compensation chamber 32 constantly maintaining the same compensation chamber 32 at atmospheric pressure.

In use, the flange 33B is supported upon the flange 36A and fixed to it by means of bolts (BL1) provided with respective nuts. Similarly the flange 32B is supported on the flange 36B. The fixing of the two flanges 32B, 36B one to the other is secured by means of bolts (BL2) provided with respective nuts.

The function performed by the siphon apparatus 30 is of particular importance.

In fact, the presence of the siphon apparatus 30 prevents an overflowing supply of slurry towards the device 11, and acting as such, provides a regular supply of the slurry itself. It goes without saying that a constant feeding of slurry towards the device 11 favors obtaining an effective filtering of slurry during the crossing of the device 11 itself (according to the arrow (F1)).

Another unique characteristic of the siphon apparatus 30 is that by properly adjusting the height (H4*) (FIG. 3) of the center (C1) of the overflow duct 34 with respect to the ground (GR) the height (H5*) may also be controlled of the free surface (PL) of slurry present in the compensation chamber 32 itself.

Therefore, for the known "principle of communicating vessels" the height (H5*) (FIG. 3) of the free surface (PL) is also the maximum height of a free surface (SS2*) of slurry within the filtering punched wall 18 and of the liquid alone within the annular discharge channel 26.

In turn, the two surfaces (SS1) (SS2*) define a dripping chamber 190, of height (H6*) (FIG. 3), wherein the slurry undergoes pre-dehydration before entering the compaction chamber 19.

In this way the siphon apparatus 30, apart from serving as a security feature of the device 11 from possible flooding and draining of fluids from the opening 22, for example, it is also utilized for adjusting the height (H6) of the dripping chamber 190.

Summarizing the advantages of the siphon apparatus 30 are the following:

(A) an optimal draining of the product, and
(B) a level of ensurance that the plug formed in section 19 will not be allowed to get wet, wherein the principle of communicating vessels are used in order to define a level above which the effluents cannot go.

Figure 4:
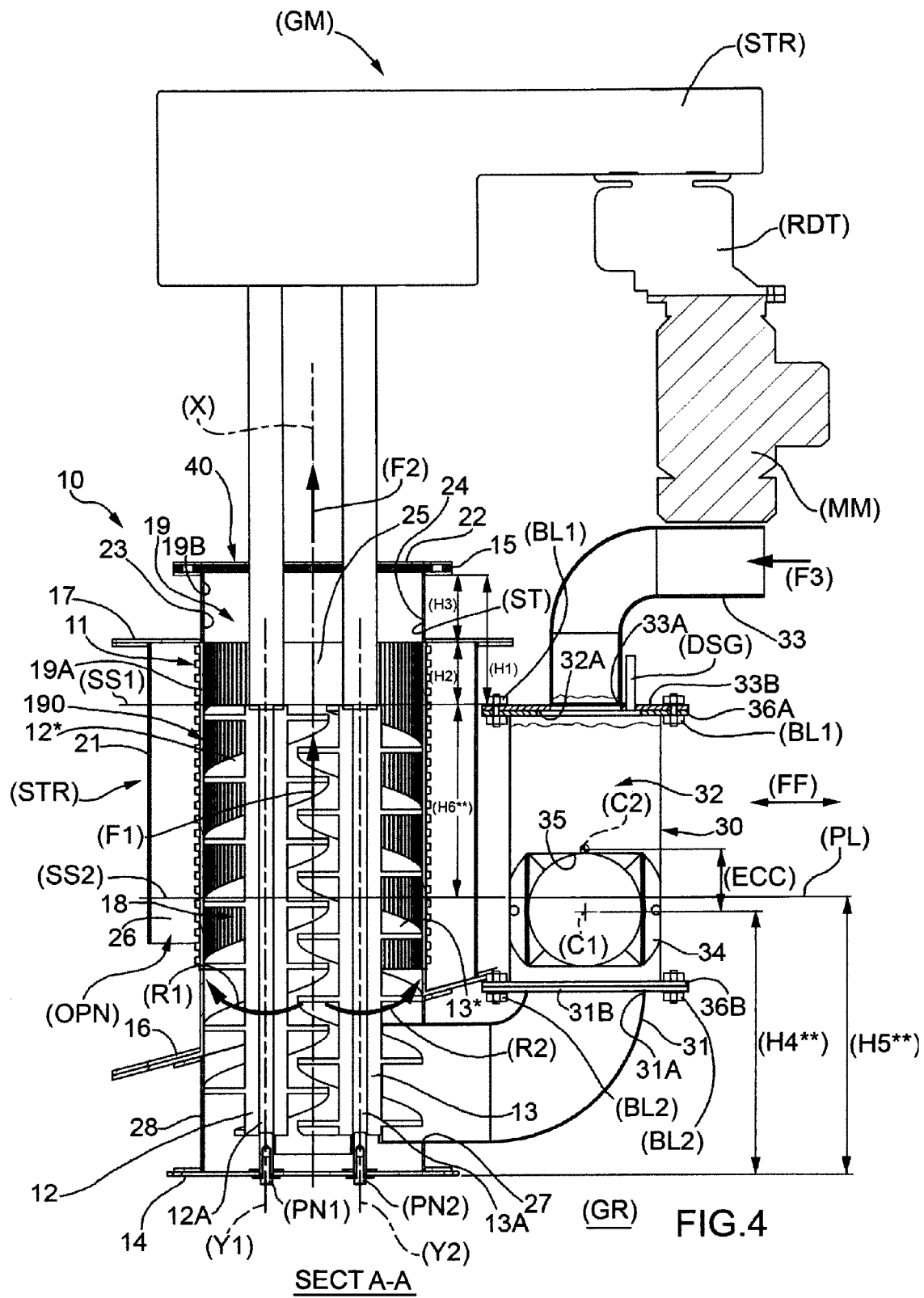
FIG. 4 illustrates the same section A-A (according to the plan ($\Phi$)) as in FIG. 3, however, in this figure a second configuration of the siphon apparatus is represented.

In other words, as shown in FIG. 4, if the height (H6) increases, allowing it to assume a value (H6), of the dripping chamber 190, for example, lowering the center (C1) (which now has a height (H4) less than (H4*)), and, therefore, decreasing the height (H5) (which becomes (H5**)) of the free surface (PL) with respect to the ground (GR), the material arriving to the portion 19A of the compaction chamber 19 is drier due to the "principle of communicating vessels", the more watery fraction of the slurry has remained lower and the slurry itself on its way to the dripping chamber 190 has had more time to dehydrate.

Also note that while crossing the dripping chamber 190 when the material loses fluid through the filtering punched wall 18 and is in the meantime shaken by the coils 12*, 13*, inside the compaction chamber 19 on the material in transit only an upwardly push is performed without it being shaken. This allows to create the ideal conditions for the formation of the abovementioned solid plug in the compaction chamber 19 itself.

Also note that it is very easy to change the height (H4) of the center (C1) of the overflow duct 34 with respect to the ground (GR) by simply unscrewing, while the plant is stationary, the nuts from respective bolts (BL1), (BL2), horizontally pulling the compensation chamber 32 (arrow (FF)) from the space comprised between the two flanges 33B, 31B, and overturning the compensation chamber 32 causing (obviously after the reinsertion of the compensation chamber 32 in the space comprised between the flanges 33B and 31B) the flange 33B to rest this time on the flange 36B and the flange 32B being pressed against the flange 36A. The two pairs of flanges 33B, 36B, respectively, 32B, 36A, are held together, respectively, by bolts VT1, and bolts VT2 (with respective nuts).

With the present invention, therefore, by way of a single compensation chamber 32 it is possible to achieved with a simple overturning, at least two values of (H5) (i.e.: (H5*), respectively (H5**)) for determining, therefore, the value of the height (H6) (i.e.: (H6*), respectively (H6**)) of the dripping chamber 190. Said height (H6), as we have said is fixed by the plant technician before the plant 10 starts working, depending on the type of slurry to be processed. If the slurry itself is fairly dry then the height (H6) may have low values, as was shown in FIG. 3, while if the mixture is quite liquid the height (H6) should be increased accordingly (FIG. 4).

Also note that, for the same overall dimensions of the compensation chamber 32, a certain role is played by the eccentricity (ECC) of the abovementioned center (C1) with respect to the center (C2) of the compensation chamber 32 itself. In other words, even if the distance between the flanges 31B and 33B remains the same it is possible to vary the height (H4) by choosing a new compensation chamber 32 having a different eccentricity (ECC).

While remaining within the scope of the present invention an alternative version of a siphon apparatus (not shown) can be utilized in which upon a wall of the compensation chamber, there are, for example, three openable hatches placed at different heights. Opening a hatch and hooking to it the overflow duct (obviously while keeping closed the other two hatches), the height of the free surface with respect to the ground can be varied.

In use, the slurry coming from the duct 33 (according to arrow (F3)) enters from above into the compensation chamber 32. Any possible portion of excess slurry is evacuated through the overflow duct 34 (according to horizontal arrow (F4)), while the remaining part flows towards the opening 27 and inside of the filtering punched wall 18 (FIG. 3).

The portion of the slurry in excess evacuated through the duct 34 is recirculated (by non illustrated means) and sent back to the feeding duct 33.

The slurry is then taken between the first coils 12*, 13* of pushing elements 12, 13 and raised according to the vertical arrow (F1).

We can say conclusively that the siphon apparatus 30 has a product path that follows at least one vertical segment in the compensation chamber 32 and uses the principle of "U" shaped communicating vessels having a horizontal overflow duct 34; allowing that the level of product in the tubular sifting device 11 cannot go beyond the compaction chamber 19.

The main advantages of the Archimedes screw separation plant for slurry object of the present invention are summarized in the following points:

a better separation between the liquid and solid phases of slurry due to the presence of at least a pair of pushing elements;

the two coils are coupled to each other so that each of them performs crushing, homogenization and flattening actions of slurry in transit, but also, possibly, of cleaning the other coil and the other shaft; in other words, by adopting the teachings of the present invention, there is an optimal "self-cleaning" of coils and shafts thus avoiding having to stop the plant for the removal of any "bridge" of solid materials that could be formed for example, between the coils and the punched wall or inside the steps of the coils themselves;

adjusting the height of the compaction chamber there is a variation of the self-compacting weight force of the material in transit;

adjusting the height of the center of the overflow duct of the siphon apparatus with respect to the ground it is also possible to control the height of a dripping chamber of the semi-solid column from which, in the compaction chamber, the solid plug will take shape, and there is a regular and constant supply to the tubular sifting device thanks to the siphon apparatus through which the exceeding portion of slurry is expelled thus avoiding overflow of the product.

The invention claimed is:

1. An Archimedes screw plant (10) for separating slurry into liquid and solid fractions, the plant (10) comprising:
   a tubular sifting device (11), having a vertical axis (X), provided with a filtering punched wall (18), said wall housing inside it vertical pushing means (12, 13) provided with coils (**12\*, 13\*), said vertical pushing means (12, 13) being able to vertically move and compress slurry; said vertical pushing means (12, 13) comprising at least two pushing elements (12, 13**) substantially conformed to an Archimedes screw (augers) that, substantially, interpenetrate each other;
   a slurry feeding device (31);
   a first evacuating device (21) for the liquid fraction after its separation from the solid fraction, separation substantially occurring inside said tubular sifting device (11);
   a second evacuating device (19, 22) for substantially dry separated solid after its separation from the liquid fraction, separation substantially occurring inside said tubular sifting device (11); a compacted product being upwardly and vertically released (F2) from said tubular sifting device;
   the plant (10) characterized in that
      said tubular sifting device (11) comprises inside it said second evacuating device, said second evacuating device comprising an upper compaction chamber (19) for the separated solid where a solid plug of product is formed; at least a first portion (19B) of said compaction chamber (19) being without said pushing elements (12, 13) and said filtering punched wall (18);
   and in that
      said compaction chamber is provided with an upper exhaust opening (22) in a vertically upper end thereof for the separated solid, said upper opening (22) being provided with an auxiliary contrast element (40) for forming said solid plug of product by counter pressure, said auxiliary contrast element (40) acting simultaneously upon all of the separated solid in transit from said upper opening (22).

2. The plant (10), as claimed in claim 1, characterized by the fact that the size of said upper opening (22) is substantially equal to that of any cross section (ST) of the tubular sifting device (11).

3. The plant (10), as claimed in claim 1, characterized in that the entire compaction chamber (19) is without said pushing elements (12, 13), at least a second portion (19A) of said compaction chamber (19) being provided with said filtering punched wall (18).

4. The plant (10), as claimed in claim 1, characterized in that said contrast element (40) comprises at least one counter pressure device (41, 42), which presents a plurality of adjacent segments (41A, 41B, 41C, 41D, 41E, 41F, 42A, 42B, 42C, 42D, 42E, 42F) attached to a common edge (51, 52) and free to flex independently of each other when subjected to the pushing action from the solid material exiting the compaction chamber (19).

5. The plant (10), as claimed in claim 4, characterized in that said at least one counter pressure device (41, 42) comprises a deformable sheet (PD), which internally houses at least one respective elastic layer (LM, LM\*, LM\*\*).

6. The plant (10), as claimed in claim 5, characterized in that the shape of said at least one respective elastic layer (LM, LM\* LM\*\*) substantially reproduces the shape of said at least one counter pressure device (41, 42).

7. The plant (10), as claimed in claim 4, characterized in that said contrast element (40) comprises at least two counter pressure devices (41, 42) side by side to each other.

8. The plant (10), as claimed in claim 4, characterized in that said at least one counter pressure device (41, 42) comprises at least two layers (LM\* LM\*\*) equal to or different from each other both in material and thickness.

9. The plant (10), as claimed in claim 8, characterized in that each layer (LM LM\* LM\*\*) is composed of equal or different segments, to or from each other, so that each segment (41A, 41B, 41C, 41D, 41E, 41F, 42A, 42B, 42C, 42D, 42E, 42F) can best respond to the different stress factors of the material exiting from said upper opening (22).

10. The plant (10), as claimed in claim 1, characterized in that the compacted product is vertically released in an upward direction through an upward facing opening.

11. The plant (10), as claimed in claim 10, characterized in that a vertical axis of the upward facing opening is parallel to longitudinal axes of the pushing means (12, 13).

\* \* \* \* \*